(12) United States Patent
Ohmi et al.

(10) Patent No.: US 8,146,924 B2
(45) Date of Patent: Apr. 3, 2012

(54) LOW-COMPRESSION FORCE METAL GASKETS

(75) Inventors: Tadahiro Ohmi, Sendai (JP); Yasuyuki Shirai, Sendai (JP); Yasushi Aburatani, Gojo (JP); Akira Muramatsu, Machida (JP); Masayuki Noguchi, Tokyo (JP); Kouji Sato, Gojo (JP); Satoshi Kumaki, Gojo (JP)

(73) Assignees: Tohoku University, Sendai-shi (JP); Nippon Valqua Industries, Ltd., Tokyo (JP)

( * ) Notice: Subject to any disclaimer, the term of this patent is extended or adjusted under 35 U.S.C. 154(b) by 829 days.

(21) Appl. No.: 12/137,361

(22) Filed: Jun. 11, 2008

(65) Prior Publication Data

US 2008/0309028 A1 Dec. 18, 2008

(30) Foreign Application Priority Data

Jun. 15, 2007 (JP) ................. 2007-159093

(51) Int. Cl.
*F16J 15/12* (2006.01)
(52) U.S. Cl. ......... 277/650; 277/652; 277/647; 277/654
(58) Field of Classification Search .................. 277/650, 277/652, 647, 654
See application file for complete search history.

(56) References Cited

U.S. PATENT DOCUMENTS

| | | | | |
|---|---|---|---|---|
| 3,083,023 A * | 3/1963 | Creavey | ........................ | 277/647 |
| 3,188,100 A * | 6/1965 | Delgado | ........................ | 277/647 |
| 3,322,433 A * | 5/1967 | Rentschler | .................... | 277/652 |
| 3,519,278 A * | 7/1970 | Stecher et al. | ................ | 277/601 |
| 3,595,588 A * | 7/1971 | Rode | ............................. | 277/650 |
| 4,218,067 A * | 8/1980 | Halling | ........................ | 277/605 |
| 4,261,584 A * | 4/1981 | Browne et al. | ................ | 277/647 |
| 4,471,968 A * | 9/1984 | Schlaupitz et al. | ........... | 277/592 |
| 5,022,663 A | 6/1991 | Fages et al. | | |
| 5,161,806 A * | 11/1992 | Balsells | ........................ | 277/383 |
| 5,249,814 A * | 10/1993 | Halling | ........................ | 277/654 |
| 6,092,811 A * | 7/2000 | Bojarczuk et al. | ............ | 277/627 |
| 6,443,502 B1 * | 9/2002 | Iida et al. | ....................... | 285/351 |
| 6,543,785 B1 * | 4/2003 | Katayama et al. | ............ | 277/534 |
| 6,631,910 B2 * | 10/2003 | Caplain et al. | ................ | 277/644 |
| 6,755,422 B2 * | 6/2004 | Potter | ............................ | 277/652 |
| 7,464,940 B2 * | 12/2008 | Datta | ............................. | 277/555 |
| 7,464,968 B2 * | 12/2008 | Sakazaki et al. | .............. | 285/242 |
| 2002/0014744 A1 * | 2/2002 | Udagawa | ....................... | 277/592 |
| 2005/0173870 A1 * | 8/2005 | Gunderson | ................... | 277/628 |
| 2008/0309028 A1 * | 12/2008 | Ohmi et al. | ..................... | 277/654 |
| 2010/0239448 A1 * | 9/2010 | Okoroafor | ..................... | 418/104 |

FOREIGN PATENT DOCUMENTS

| | | |
|---|---|---|
| JP | 09032928 A | 7/1997 |
| JP | 2000000010 U | 1/2000 |
| JP | 3110307 B2 | 11/2000 |

* cited by examiner

*Primary Examiner* — Alison Pickard
(74) *Attorney, Agent, or Firm* — The Webb Law Firm

(57) ABSTRACT

A low-compression force metal gasket includes a coating layer containing a polymer material on at least a sealing surface of the gasket, and the coating layer satisfies the following conditions (1) to (3): (1) the layer comprises a resin, a rubber or a mixture thereof having an oxygen gas permeability coefficient at 25° C. of $10 \times 10^{-12}$ to $0.1 \times 10^{-12}$ (m²/s); (2) when the layer is compression deformed, the storage elastic modulus (E') at 200° C. is in the range of $1.0 \times 10^7$ to $1.0 \times 10^2$ Pa; and (3) the coating layer has a thickness of 1 to 40 μm. The gasket provides a high seal at a low clamping force.

7 Claims, 6 Drawing Sheets

Details of Portion A

LOW-COMPRESSION FORCE METAL GASKETS

FIELD OF THE INVENTION

The present invention relates to low-compression force metal gaskets, and more particularly to low-compression force metal gaskets creating a high seal with a low clamping force.

BACKGROUND OF THE INVENTION

Elastomeric sealants are frequently used in the field of semiconductors, but they are often unsuitable for use in areas where high heat resistance is required. The elastomeric sealants are permeable and cause leakage, and therefore their sealing properties are insufficient when high airtightness is required.

Metal gaskets are sealants having high airtightness and high heat resistance. The metal gaskets, however, entail a high clamping force to ensure high sealing properties, which leads to increase in size and thickness of vessels or apparatuses where the gaskets are attached.

Of the metal gaskets, spring-energized metal C-rings provide high sealing properties with a relatively low clamping force. However, the clamping force is still ten times or more as high as that of rubber O-rings.

The following methods (1) and (2) are suggested to solve such problems.

(1) The sealing surface of a metal gasket is processed for easy stress concentration, whereby high stress is generated even at a small load (clamping force) and good conformability is obtained.

For example, JP-U-2000-10 (Patent Document 1) teaches that the sealing surface has protrusions (numeral 18 in FIG. 2). However, gaskets according to this teaching require a very high clamping force, and this problem cannot be solved even by using rubbers in combination therewith.

Japanese Patent No. 3110307 (Patent Document 2) describes that the sealing surface has dents (grooves). However, the corners of the grooves come in contact with mating parts.

As described above, a relatively high clamping force is required to deform metals and create an effective seal even with the stress concentration according to the method (1).

(2) A metal gasket is provided with a soft covering layer (coat, plating).

JP-A-H09-32928 (Patent Document 3) discloses that a polyimide resin coat is formed on a metal gasket.

According to the method (2), however, the soft covering layer is preferentially deformed at a low stress and the sealing surface of the metal gasket is not deformed easily. Accordingly, stable sealing properties cannot be reliably obtained at a low stress.

Although the methods (1) and (2) have some effects as described above, even the combination of the methods (1) and (2) needs a very high clamping force to achieve a desired high seal, for example more than several times as high as the clamping force required for O-rings. Thus, there has been a demand for sealants achieving high airtightness at a lower clamping force.

Patent Document 1: JP-U-2000-10
Patent Document 2: Japanese Patent No. 3110307
Patent Document 3: JP-A-H09-32928

DISCLOSURE OF THE INVENTION

The present invention is aimed at solving the aforementioned problems. It is therefore an object of the invention to provide low-compression force metal gaskets capable of achieving sealing properties equal to or higher than those obtained with elastomeric double seals at a low clamping force.

The present inventors studied diligently and have arrived at low-compression force metal gaskets providing high sealing properties at a low clamping force, which may be enabled by a structure (low-compression force metal gasket 50) as illustrated in FIG. 1 wherein an outer surface 40A (20A) of a metal C-ring base material 40 is provided with a coating layer 30 such as a fluororubber coat or a fluororesin coat that contains a polymer material with specific properties (such as oxygen permeability and elastic modulus).

A low-compression force metal gasket according to the present invention includes a coating layer containing a polymer material on at least a sealing surface of the gasket, the coating layer satisfying the following conditions (1) to (3):

(1) the layer comprises a resin, a rubber or a mixture thereof having an oxygen gas permeability coefficient at 25° C. of $10 \times 10^{-12}$ to $0.1 \times 10^{-12}$ (m²/s);

(2) when the layer is compression deformed, the storage elastic modulus (E') at 200° C. is in the range of $1.0 \times 10^7$ to $1.0 \times 10^2$ Pa;

(3) the coating layer has a thickness of 1 to 40 μm, and preferably 1 to 20 μm.

The gasket is preferably softened such that the sealing surfaces are plastically deformed and desired high sealing properties are obtained at a low clamping force.

The coating layer preferably comprises a fluororubber or a fluororesin in view of heat resistance, chemical resistance and plasma resistance.

The low-compression force metal gasket is preferably a metal C-ring gasket or a spring-energized metal C-ring gasket. These kinds of gaskets achieve high sealing properties at a relatively low clamping force among metal gaskets. The gasket is C-shaped and partially softened to have plasticity, and has hardness distribution due to work hardening and softening phenomenal which permits the sealing surfaces to be plastically deformed easily when the gasket is clamped.

The low-compression force metal gaskets according to the present invention achieve high sealing properties at a low clamping force.

BRIEF DESCRIPTION OF THE DRAWINGS

FIG. 6 shows changes with time of the leakage amounts; wherein:

10 . . . spring (ring shaped in cross section)
10A . . . spring surface
20 . . . metal C-ring
20A . . . surface of metal C-ring
30 . . . fluororubber coat
30A . . . surface of fluororubber coat 40 . . . metal C-ring base material
40A . . . surface of metal C-ring base material
50 . . . fluororubber-coated metal C-ring gasket

BEST MODE FOR CARRYING OUT THE
INVENTION

Low-compression force metal gaskets according to the present invention will be described with reference to the drawings.

Figure 1:
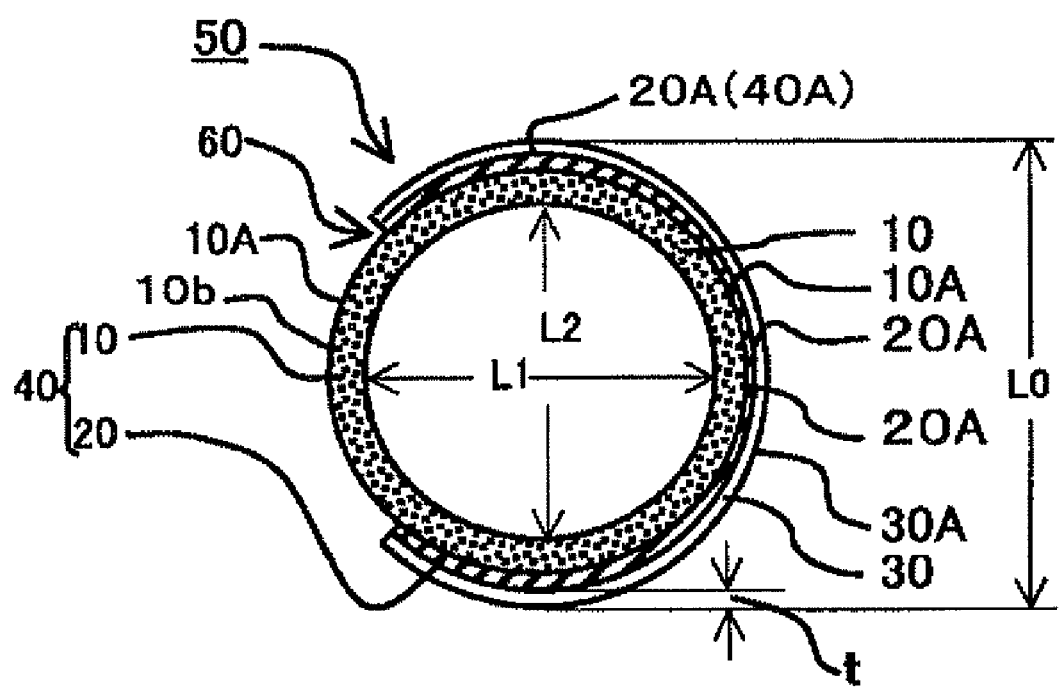
FIG. 1 is a schematic sectional view of a fluororubber-coated metal C-ring according to a preferred embodiment of the present invention wherein an outer surface of a metal C-ring base material is coated with a fluororubber.
Figure 2:
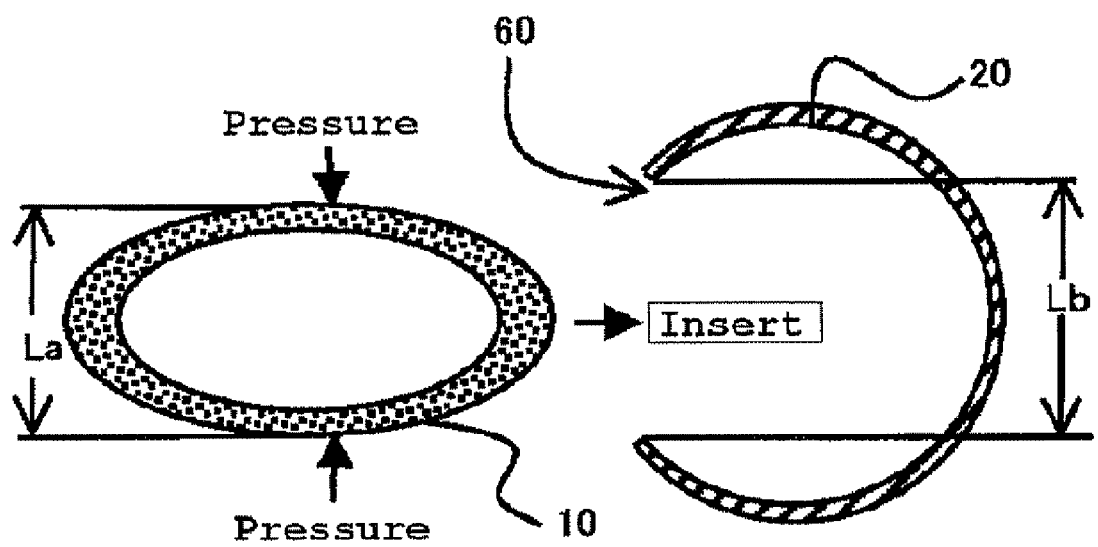
FIG. 2 is a sectional view wherein a ring spring 10 is described to be vertically compressed and inserted in a metal C-ring.

FIG. 1 shows a preferred embodiment of a low-compression force metal gasket according to the present invention.

A low-compression force metal gasket 50 has a coating layer 30 containing a polymer material on at least a sealing surface of the gasket. In other words, the gasket is a sealing surface-coated metal C-ring gasket.

In FIG. 1, the coating layer 30 is a fluororubber coat (coating layer).

In the low-compression force metal gasket 50, the coating layer 30 containing a polymer material is provided on an outer surface (sealing surface) 40A (20A) of a metal C-ring base material 40.

The coating layer 30 may extend to an opening 60 of the metal C-ring base material 40 or may further extend to a surface 10A of a spring 10 (ring shaped in cross section) (left side 10A of the spring 10 in FIG. 1) (not shown).

The coating layer 30 is not limited to the fluororubber coat (coating layer) and may be, for example, a fluororesin layer.

In the low-compression force metal gasket 50, the coating layer 30 satisfies the following conditions (1) to (3):

(1) the layer comprises a resin, a rubber or a mixture thereof having an oxygen gas permeability coefficient at 25° C. of $10 \times 10^{-12}$ to $0.1 \times 10^{-12}$ (m$^2$/s);

(2) when the layer is compression deformed, the storage elastic modulus (E') at 200° C. is in the range of $1.0 \times 10^7$ to $1.0 \times 10^2$ Pa;

(3) the coating layer has a thickness of 1 to 40 μm, and preferably 1 to 20 μm.

To achieve desired permeation and leakage amounts for oxygen gas, the oxygen gas permeability coefficient and thickness of the coating layer should be controlled. Provided that the thickness is the same, too large an oxygen gas permeability coefficient (for example, exceeding $10 \times 10^{-12}$ m$^2$/s, in particular $15 \times 10^{-12}$ m$^2$/s) requires a very high level of precision in the controlling of the layer thickness, causing difficulties in practical production. If the oxygen gas permeability coefficient is excessively small (for example, less than $0.1 \times 10^{-12}$ m$^2$/s, in particular $0.8 \times 10^{-13}$ m$^2$/s), the layer may fail to achieve a desired deformation (thickness) under a predetermined load. This is due to the fact that a fluororubber having a small oxygen gas permeability coefficient has a high crosslinking degree. That is, the rubber has a high elastic modulus and is less deformable. Great difficulties will be encountered in having an extremely small oxygen gas permeability coefficient or in obtaining a perfect elastic body.

If the storage elastic modulus is larger than $1.0 \times 10^7$ Pa, the coating layer fails to achieve a desired deformation (thickness) under a predetermined load for the reasons described above, and will not conform to a mating surface sufficiently. If the storage elastic modulus is less than $1.0 \times 10^2$ Pa (1 E+02 Pa), the coating layer is excessively relaxed under a predetermined load and flows or breaks to fail to function as a coat. In both cases, the gasket tends to fail to provide a sufficient seal even if adequately clamped.

In a preferred embodiment, the coating layer has a thickness of 1 to 40 μm, and more preferably 1 to 20 μm. The coating layer with the above properties should be preferably provided in this thickness on a metal gasket.

In a preferred embodiment of the invention, the low-compression force metal gasket 50 is preferably softened such that the sealing surfaces are plastically deformed easily and conform to mating surfaces sufficiently.

The low-compression force metal gasket has the above coating layer properties (1) to (3) and thereby ensures high sealing properties at a low clamping force.

[Production of Metal Gasket]

Preferred processes for the production of the low-compression force metal gaskets of the invention include the following.

<Production of Fluorine-coated Metal C-ring>

Commercially available metal C-rings and spring-energized metal C-rings may be used in the invention, with examples including No. 3645 Trypack manufactured by NIPPON VALQUA INDUSTRIES, LTD. For the production, conventional methods and techniques may be used such as a method disclosed in JP-B-H07-103932.

The sizes of the low-compression force metal gasket 50 and parts thereof are not particularly limited and may be determined appropriately depending on applications. For example, a low-compression force metal gasket 50 for use in a semiconductor manufacturing apparatus may be approximately 10 to 300 mm in inner diameter of the gasket, approximately 2 to 5 mm in height L0, and approximately 1 to 500 μm in thickness t of a fluorine coating layer 30.

Referring to the fluorine coating layer, the type of fluororesin or fluororubber is not particularly limited. The fluororesin or fluororubber coating layer 30 may have an oxygen gas permeability coefficient and an elastic modulus controlled to the aforementioned ranges by the following methods.

In general, the oxygen gas permeability coefficient depends on the entanglement of crystals or molecules and intermolecular interactions. The above oxygen gas permeability coefficient may be obtained by controlling the specific gravity or hardness (crosslink density) of the fluororesin or fluororubber coating layer 30 using conventional methods.

For a fluororubber coating layer, the crosslink density may be controlled by using a known crosslinking agent such as triallyl isocyanurate (trade name: TAIC, manufactured by Nippon Kasei Chemical Co., Ltd.) and manipulating heating conditions and heating atmosphere.

For a fluororesin coating layer, the specific gravity of the fluororesin coating layer may be controlled by establishing a specific chemical structure by modifying ethylene tetrafluoride-derived units with perfluoroalkyl groups or by copolymerizing ethylene tetrafluoride and ethylene in a specific ratio into an ethylene tetrafluoride/ethylene copolymer. The controlling of the specific gravity may further involve addition of fillers such as glass and bronze to the (co)polymer.

The elastic modulus (storage elastic modulus E') of the coating layer may be controlled to the desired range by these methods.

<Production of Fluororesin Coating Layer>

In an embodiment of the low-compression force metal gaskets of the invention, a fluororesin-coated metal C-ring may be produced by the following method.

A metal gasket base material (metal C-ring base material) 40 as shown in FIG. 1 is brush-coated one or more times, and preferably about 1 to 10 times with a coating material for a fluororesin coating layer 30. The coating is air dried at room temperature to give a dry coating layer 30 with a thickness t of about 1 to 500 μm. A fluororesin-coated metal C-ring 50 thus obtained has predetermined layer hardness, elastic modulus and bond strength.

Examples of the fluororesin coating materials include coating materials containing fluororesins and solvents such as fluorine-containing solvents and/or fluorine-free solvents such as MEK (methyl ethyl ketone). The fluororesin component may account for about 1 to 15 wt % (e.g. 1 to 8 wt %) of the coating solution. The evaporation of the solvents results in a fluororesin coating layer.

Commercially available fluororesin coating materials may be used in the invention, with examples including INT332QA manufactured by NI MATERIAL Co., LTD. (fluororesin content: 8%, containing a fluorine-containing solvent and methyl ethyl ketone). This coating material gives a fluororesin coating layer upon evaporation of the solvents.

Examples of the fluororesins used in the preparation of the fluororesin coating materials include known fluororesins as described in JP-A-2006-160933, paragraph [0006]. Specific examples are PFA (tetrafluoroethylene-perfluoroalkyl vinyl ether copolymers), ETFE (ethylene-tetrafluoroethylene copolymer), PVF (polyvinyl fluoride), PVDF (polyvinylidene fluoride), ECTFE (ethylene-chlorotrifluoroethylene copolymer), FEP (tetrafluoroethylene-hexafluoropropylene copolymer) and poly(2-(perfluoroalkyl-alkyl methacrylates)).

Preferred examples of the fluororesins include (co)polymers of perfluoroalkyl-alkyl(meth)acrylates ($CH_2=CR^1-COO-(CH_2)_n-Rf$ wherein $R^1$ is H or $CH_3$, n is an integer of 0 to 6, and Rf is a C2-16 perfluoroalkyl group) having a weight-average molecular weight Mw (measured by GPC in tetrahydrofuran solvent relative to polystyrene standards) of 3000 to 400000, as described in JP-A-2006-160933.

Examples of the solvents used in the preparation of the fluororesin coating materials include conventional solvents as described in JP-A-2006-160933, paragraph [0012]. Specific examples include:

ketones such as acetone, MEK and MIBK;
esters such as ethyl acetate and butyl acetate;
ethers such as diethyl ether and dioxane;
alkanes such as heptane and hexane; and
alcohols such as ethanol and IPA.

Of the solvents, the fluorine-containing solvents are preferred.

The fluorine-containing solvents have high compatibility with fluoropolymers and are nonflammable, whereby no special exhaust equipment or explosion-proof equipment is required for the coating.

Examples of the fluorine-containing solvents include PFC (perfluorocarbon), HFC (hydrofluorocarbon), HCFC (hydrochlorofluorocarbon), HFE (hydrofluoroether), PFPE (perfluoropolyether) and HFPE (hydrofluoropolyether). These solvents may be used singly, or two or more kinds may be used in combination.

<Production of Fluororubber Coating Layer>

An exemplary fluororubber coating material contains a raw fluororubber (such as DAI-EL G901 of DAI-EL G900 series, manufactured by DAIKIN INDUSTRIES, Ltd.), a solvent (such as methyl ethyl ketone), a crosslinking agent (such as TAIC (triallyl isocyanurate), manufactured by Nippon Kasei Chemical Co., Ltd.) and a crosslinking initiator (such as PERHEXA 25B, manufactured by NOF CORPORATION), wherein the raw fluororubber (FKM, polymer) accounts for about 5 to 20 wt % (e.g. 10 wt %) of the fluororubber coating material, and the amounts of the crosslinking agent and the crosslinking initiator are 2 to 15 parts by weight (e.g. 6 parts by weight) and 0.1 to 5 parts by weight (e.g. 2 parts by weight), respectively, based on 100 parts by weight of the polymer.

For the preparation of such fluororubber coating material, a raw fluororubber (DAI-EL G900 series) may be dissolved in a solvent (MEK) to a rubber concentration of a little more than 10 wt %, and the resultant viscous solution of the raw rubber may be blended with a crosslinking agent (TAIC) and a crosslinking initiator (PERHEXA 25B) followed by stirring.

Prior to the application of the fluororubber coating material, a metal C-ring base material 40 (such as Trypack manufactured by NIPPON VALQUA INDUSTRIES, LTD.) is pretreated by coating a surface 40A (20A) of the base material 40 with a vulcanizable adhesive (such as METALOC S-10A, manufactured by TOYO KAGAKU KENKYUSHO CO., LTD.) and baking the adhesive at about 100 to 200° C. (e.g. 150° C.) for about 10 to 60 minutes (e.g. 30 minutes).

Subsequently, the pretreated metal C-ring base material is soaked (dipped) in the fluororubber coating material (raw rubber solution) one or more times, and preferably about 1 to 15 times (e.g. 8 times) so that a desired thickness can be obtained.

The coating is then dried by air drying or the like (coating layer thickness: about 1 to 500 μm) and is heated in a vacuum electric furnace at 150° C. to below the decomposition temperature of the fluororubber (e.g. 200° C.) for 10 to 48 hours (e.g. 24 hours), resulting in a fluororubber-coated metal C-ring (low-compression force metal gasket) wherein the coating layer has a predetermined elastic modulus.

EXAMPLES

The low-compression force metal gaskets, in particular fluororesin-coated metal C-ring gaskets and fluororubber-coated metal C-ring gaskets that are preferred embodiments of the invention will be described in detail without limiting the scope of the invention.

Preparation and Seal Tests for Fluorine-coated C-ring Gaskets

Example 1

Fluororesin-coated Metal C-ring Gaskets

A. Seal Test
(A-1) Specifications of Gaskets and Flanges
Gasket Base Material 40:

TABLE 1

| Product name | Materials | Size |
| --- | --- | --- |
| No. 3645 Trypack (manufactured by NIPPON VALQUA INDUSTRIES, LTD.) | Spring 10: SUS 304 Outer cover 20: aluminum | V-24 (ID: 25, diameter: 3.8, unit (mm)) |

Flanges (mating members for gasket): Made of aluminum. Surface roughness on the seal surface: approximately 3 μm.
(A-2) Coating method
(A-2-1) Fluororesin Coating Material INT332QA manufactured by NI MATERIAL Co., LTD. was used.

The coating material contained a fluororesin, a fluorine-containing solvent and methyl ethyl ketone. The resin component accounted for 8 wt % of the coating material solution. This coating material gave a fluororesin coating layer upon evaporation of the solvents.

(A-2-2) Method for Coating with Fluororesin Coating Material

A metal gasket base material (metal C-ring base material) 40 as shown in FIG. 1 was brush-coated about 1 to 10 times with the coating material for a fluororesin coating layer 30. The coating was air dried at room temperature (25° C.) to give a dry coating layer 30. The thickness t of the coating layer was measured to range from about 1 to 3 μm by the Eddy current method (ISOSCOPE MP30 manufactured by Fischer Instruments K.K.).

(A-3) Tests (A-3-1) Helium Leak Test

The above gaskets coated with the coating material (fluororesin-coated metal C-ring gaskets) according to the present invention, and conventional gaskets without any coating (uncoated metal C-ring base materials 40 (Trypack manufactured by NIPPON VALQUA INDUSTRIES, LTD., the same applies thereinafter)) were subjected to a seal test at normal temperature (25° C.).

During the test, the gaskets were compressed while monitoring the linear pressure on an autograph, and the leakage amount was measured with a helium leak detector (abbreviated to HLD, a product from ULVAC, Inc.).

Figure 3:
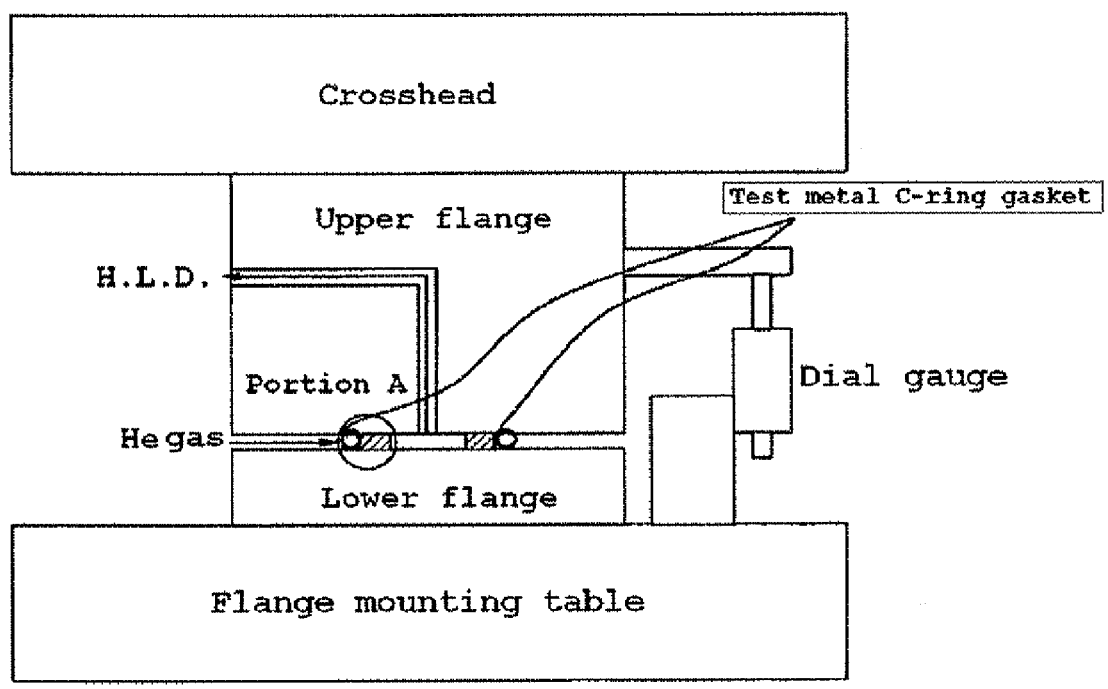
FIG. 3 is a schematic view of leakage measurement with a helium leak detector.

In the leak test, which is illustrated in FIG. 3, the flanges were compressed against each other with the gaskets therebetween. The space between the flanges was evacuated using the HLD, and helium gas from an outside source was blown to the gaskets to test sealing properties.

Figure 4:
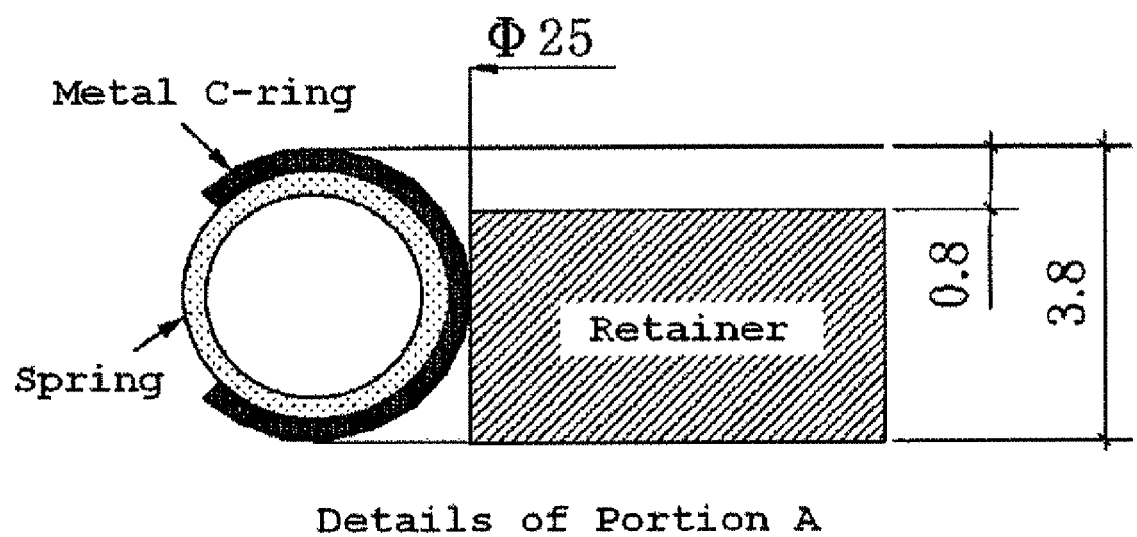
FIG. 4 is a schematic view of a metal C-ring base material 40 used in the leakage measurement, wherein a fluororesin coat 30 according to the invention will be provided on a surface of the metal C-ring base material 40.

FIG. 4 illustrates the metal C-ring base material 40 used herein.

The fluororesin coat 30 was provided on the surface of the metal C-ring base material 40.

During the test, the compressing load was gradually increased. A load at which the leakage was below the measurable limit of the HLD ($1 \times 10^{-11}$ atm-cc/s) was referred to as an airtightness initiation load. The load was then lowered, and a load at which the leakage was above the HLD measurable limit was determined as an airtightness limit load.

The airtightness initiation load of the coated metal C-ring gaskets was 50 (kN/m), and the airtightness limit load was 15 (kN/m).

Figure 5:
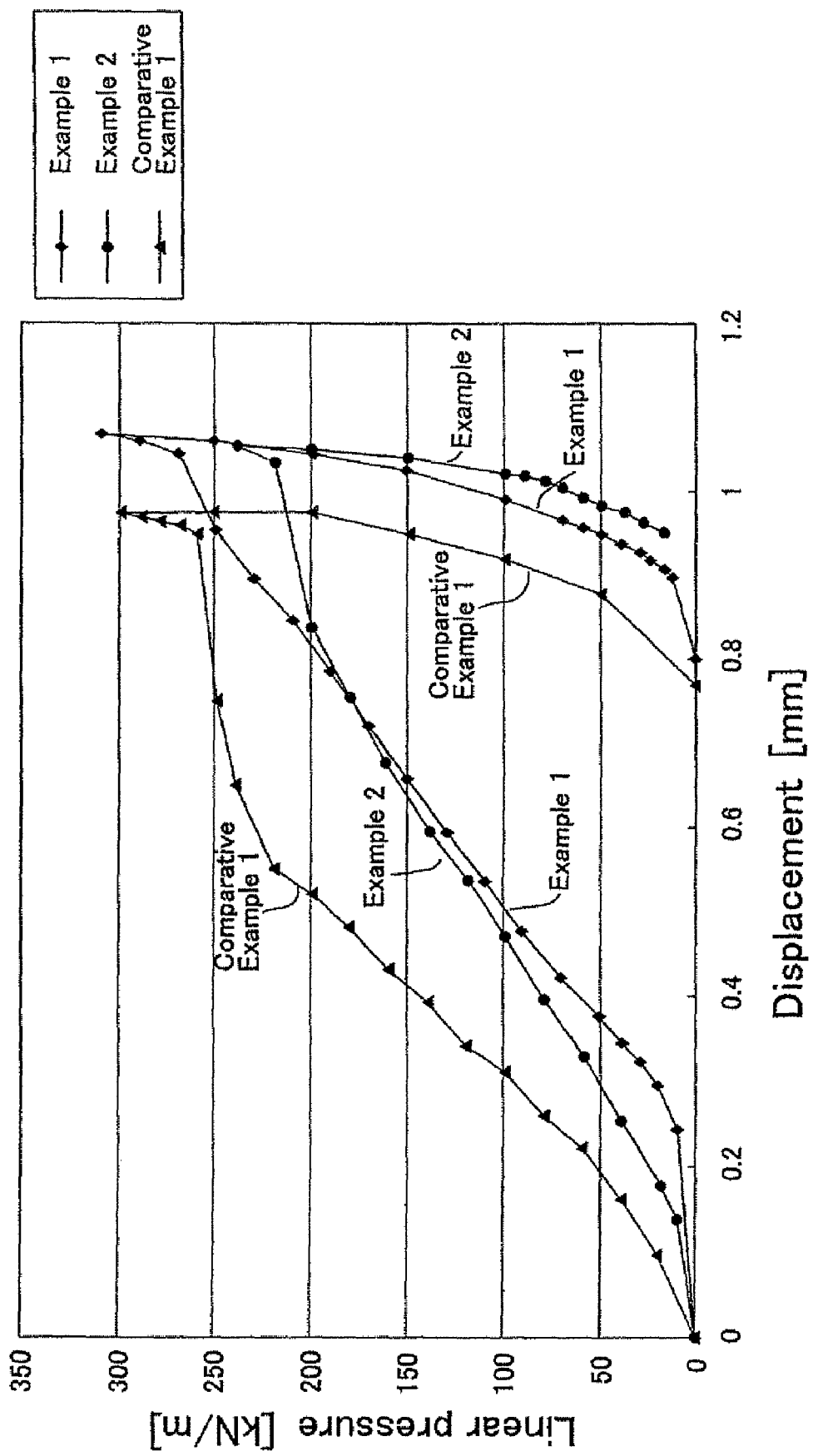
FIG. 5 shows results of the helium leak tests.

The test results in Examples and Comparative Examples are shown in Table 4 and FIG. 5.

(A-3-2) Changes with Time of Leakage Amounts

Separately, samples of the fluororesin-coated metal C-ring gasket were tested to determine changes with time of the leakage amounts using the HLD while maintaining the load constant at the airtightness initiation load.

After 0 hour (Initial): 1.2 E-09 (Pa-m$^3$/s)
After 24 hours: 1.0 E-09 (Pa-m$^3$/s)

Figure 6:
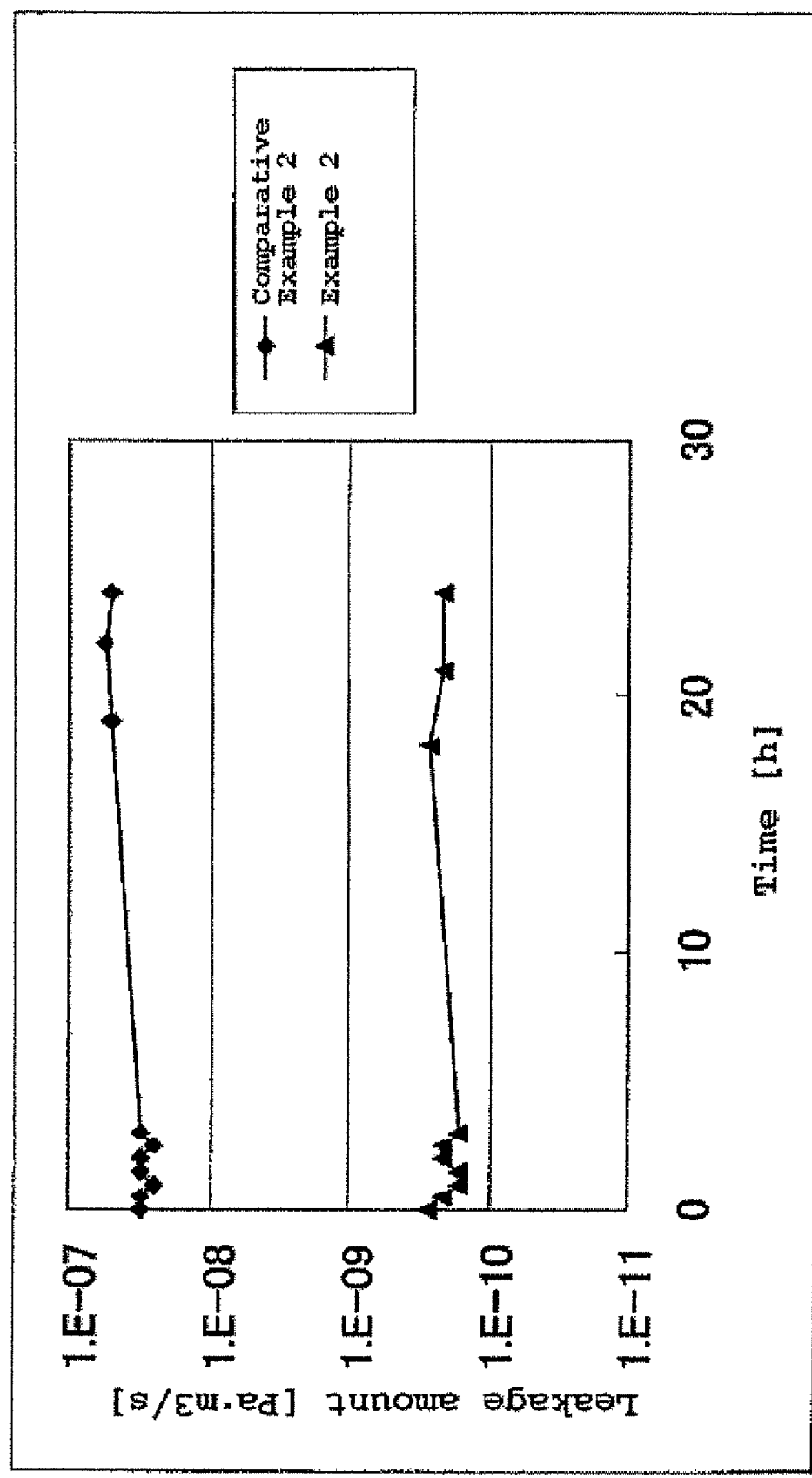

The test results in Examples and Comparative Examples are shown in Table 5 and FIG. 6.

Example 2

Fluororubber-coated Metal C-ring Gaskets

A. Seal test
(A-1) Specifications of Gaskets and Flanges
The same as in Example 1.
(A-2) Coating Method
(A-2-1) Fluororubber Coating Material (Raw Rubber Solution)

A raw rubber (DAI-EL G901 of DAT-EL G900 series, manufactured by DAIKIN INDUSTRIES, Ltd., hereinafter also referred to as the polymer) was dissolved in MEK (methyl ethyl ketone) to a concentration of a little more than 10 wt % (specifically 12.5 wt %) to give a viscous raw rubber solution.

The viscous solution was combined with crosslinking agent TAIC (manufactured by Nippon Kasei Chemical Co., Ltd.) and crosslinking initiator PERHEXA 25B (manufactured by NOF CORPORATION) in a polymer:TAIC:PERHEXA 25B weight ratio of 100:6:2, thereby giving a coating material.

The ingredients used in the rubber coating material are shown in Table 2.

TABLE 2

| | |
|---|---|
| Raw rubber | DAI-EL G901 (FKM) from DAIKIN INDUSTRIES, Ltd. |
| Crosslinking agent | TAIC from Nippon Kasei Chemical Co., Ltd. |
| Crosslinking initiator | PERHEXA 25B from NOF CORPORATION |
| Adhesive | METALOC S-10A from TOYO KAGAKU KENKYUSHO CO., LTD. |

(A-2-2) Method for Coating with Fluororubber Coating Material

A surface of a metal gasket base material 40 (metal C-ring base material, trade name: Trypack manufactured by NIPPON VALQUA INDUSTRIES, LTD.) was coated with a vulcanizable adhesive (METALOC S-10A manufactured by TOYO KAGAKU KENKYUSHO CO., LTD.). The adhesive was baked at 150° C. for 30 minutes.

The gasket base material was soaked (dipped) in the raw rubber solution from (A-2-1) eight times. The coating was air dried and was heated in a vacuum electric furnace at 200° C. for 24 hours. A fluororubber-coated metal C-ring gasket was thus obtained.

(A-3) Tests (A-3-1) Helium Leak Test

The above gaskets coated with the coating material (fluororubber-coated metal C-ring gaskets) according to the present invention were subjected to a seal test at normal temperature (25° C.).

The test conditions were the same as those in Example 1 described above.

The airtightness initiation load of the coated metal C-ring gaskets was 10 (kN/m), and the airtightness limit load was 50 (kN/m).

The test results in Examples and Comparative Examples are shown in Table 4 and FIG. 5.

(A-3-2) Changes with Time of Leakage Amounts

Separately, samples of the fluororubber-coated metal C-ring gasket were tested to determine changes with time of the leakage amounts using the HLD while maintaining the load constant at the airtightness initiation load. The results are as follows.

After 0 hour (Initial): 2.7 E-10 (Pa-m$^3$/s)
After 24 hours: 2.1 E-10 (Pa-m$^3$/s)

The test results in Examples and Comparative Examples are shown in Table 5 and FIG. 6.

B. Elastic Modulus Measurement The above-described fluororubber coating material was applied to a 50×50×1 mm aluminum plate (No. 3645 Trypack manufactured by NIPPON VALQUA INDUSTRIES, LTD., having the same composition as that of the outer cover 20) under the coating conditions as described above. The storage elastic modulus was determined with DVE Rheospectoler V4 (manufactured by Rheology Co., Ltd.).

In the measurement of storage elastic modulus, the measurement temperatures were from −100 to +250° C., the temperature increasing rate was 5° C./min, the compressing mode was 10 Hz, and the displacement was 2.0 μm.

<Consideration>

Tan δ peaks were observed in the range of 0 to 50° C.

The storage elastic modulus (E') was constant at 1×10$^7$ Pa at temperatures of 50 to 200° C., and was constant at 0.8×10$^7$ Pa at temperatures of 200 to 250° C.

The storage elastic modulus (E') at 200° C. was 0.9×10$^7$ Pa.

Comparative Example 1

Metal C-ring Gasket

A. Seal Test
(A-1) Specifications of Gaskets and Flanges
The same as in Example 1.
Conventional gaskets without any coating (uncoated metal C-ring base materials 40 (Trypack manufactured by NIPPON VALQUA INDUSTRIES, LTD.) were used.
(A-2) Helium Leak Test
The above conventional gaskets were subjected to a seal test at normal temperature (25° C.)
The test conditions were the same as those in Example 1.
The airtightness initiation load of the metal C-ring gaskets was in the range of 70 to 90 (kN/m), and the airtightness limit load was from 30 to 50 (kN/m).
The test results in Examples and Comparative Examples are shown in Table 4 and FIG. 5.

Comparative Example 2

Fluororubber O-ring Gasket

A. Seal Test
(A-1) Specifications of Gaskets and Flanges
Gasket: Fluororubber O-ring Gasket

TABLE 3

| Product name | Material | Size |
|---|---|---|
| D0270 | FKM | Diameter: 3.8 mm |

Flanges (mating members for gasket): Made of aluminum. Surface roughness on the seal surface: approximately 3 μm.
(A-2) Changes with Time of Leakage Amounts
Changes with time of the leakage amounts were determined using the HLD while maintaining the load constant at the airtightness initiation load. The results are as follows.
After 0 hour (Initial): 3.2 E-08 (Pa-m$^3$/s)
After 24 hours: 5.1 E-08 (Pa-m$^3$/s)
The test results in Examples and Comparative Examples are shown in Table 5 and FIG. 6.

<Summary of Seal Test Results>
(1) Helium Leak Test
The results of helium leak test in Examples 1 and 2 and Comparative Examples 1 and 2 are discussed (Table 4, FIG. 5).

<Consideration>
The fluororesin-coated metal C-ring gaskets and the fluororubber-coated metal C-ring gaskets according to the present invention achieved lower airtightness initiation loads and airtightness limit loads as compared with the conventional gaskets.

In other words, the fluorine-coated gaskets of the invention can provide a high seal at a lower clamping force than required with the conventional metal gaskets without any coating. The fluororubber O-ring gaskets failed to achieve airtightness.

TABLE 4

|  | Ex. 1 | Ex. 2 | Comp. Ex. 1 | Comp. Ex. 2 |
|---|---|---|---|---|
| Airtightness initiation load (kN/m) | 50 | 10 | 70-90 | Airtightness failed |
| Airtightness limit load (kN/m) | 15 | 50 | 30-50 | Airtightness failed |

(2) Changes with Time of Leakage Amounts
The over-time changes of helium gas leakage amounts in Examples 1 and 2 and Comparative Examples 1 and 2 are discussed (Table 5, FIG. 6).

<Consideration>
The fluororesin-coated metal C-ring gaskets and the fluororubber-coated metal C-ring gaskets according to the present invention achieved a very small leakage at an initial stage (after 0 hour) and the leakage amount did not increase substantially after 24 hours.

In other words, the gaskets of the invention given an appropriate clamping force can achieve higher sealing properties than those obtained with rubber O-ring gaskets, and can maintain the high sealing performance for a long period.

TABLE 5

|  | Ex. 1 | Ex. 2 | Comp. Ex. 1 | Comp. Ex. 2 |
|---|---|---|---|---|
| Leakage amount (Pa-m$^3$/s) after 0 hour | 1.2E−09 | 2.7E−10 | No leak | 3.2E−08 |
| Leakage amount (Pa-m$^3$/s) after 24 hours | 1.0E−09 | 2.1E−10 | No leak | 5.1E−08 |

In Example 2, the layers were formed in a thickness of 40 μm or 10 μm and the He gas permeation and leakage amount was determined in each case, resulting in 2.7×10$^{-10}$ Pa-m$^3$/s and 7.0×10$^{-11}$ Pa-m$^3$/s, respectively. FIG. 6 shows the result obtained with the 40 μm thick layer.

The compressive elastic modulus of the 40 μm thick layer and the 10 μm thick layer was 6×10$^7$ Pa, and therefore the layer thickness under compression at a linear pressure of 10 kN/m were 20 μm and 5 μm, respectively.

The permeation and leakage amount $Q_p$ (Pa-m$^3$/s) that indicates sealing properties in the invention is obtained by Formula (1):

$$Q_p = KA(P0-P1)/L$$

wherein:
K: Permeability coefficient (m$^2$/s)
A: Cross sectional area of the coating layer (m$^2$)
L: Length of the coating layer (m)
P0, P1: Pressures outside and inside the gaskets (Pa)

Provided that the compressed coating layer has an approximately rectangle cross section, the cross sectional area is represented by:

$$A = 2Ld \text{ (wherein } d \text{ is the coating layer thickness}(m)).$$

That is, Formula (1) may be transformed to Formula (2) below:

$$Q_p = 2Kd(P0 - P1)$$

Since P0 is an atmospheric pressure and P1 is a reduced pressure, P1 may be approximated to 0 (zero).

Since the atmospheric pressure P0 is approximately $1.0 \times 10^5$ (Pa), $Q_p = 2Kd (1.0 \times 10^5)$ (Formula 3) may be derived.

Since the permeability coefficient of a material is fixed, the permeation and leakage amount is proportional to the layer thickness.

By substituting the measured values into Formula (3), the permeability coefficient for He in the invention may be determined to be $7.0 \times 10^{-11}$ (m$^2$/s).

According to literature ("VALQUA HANDBOOK" (p. 140, 2005)), the permeability coefficient of fluororubber for He gas and that for oxygen gas $O_2$ are $7.1 \times 10^{-12}$ to $16 \times 10^{-12}$ (m$^2$/s) and $0.99 \times 10^{-12}$ to $1.1 \times 10^{-12}$ (m$^2$/s), respectively.

Based on this, the permeability coefficient ratio $K(O_2)/K(He)$ is:

$$K(O_2)/K(He) \approx 0.09$$

The coating layers according to the present invention are fluorine containing materials and therefore should satisfy this coefficient ratio.

Thus, the permeability coefficient of the coating layer for $O_2$ at 25° C. will be $K = 0.63 \times 10^{-11}$ (m$^2$/s).

What is claimed is:

1. A low-compression force metal gasket including a coating layer containing a fluororubber, a fluororesin or a mixture thereof on at least a sealing surface of the gasket, the coating layer satisfying the following conditions (1) to (3):
   (1) the layer comprises a resin, a rubber or a mixture thereof having an oxygen gas permeability coefficient at 25 ° C. of $10 \times 10^{-12}$ to $0.1 \times 10^{-12}$ (m$^2$/s);
   (2) when the layer is compression deformed, the storage elastic modulus (E') at 200° C. is in the range of $1.0 \times 10^7$ to $1.0 \times 10^2$ Pa; and
   (3) the coating layer has a thickness of 1 to 40 μm.

2. The gasket according to claim 1, which is softened such that the sealing surfaces are plastically deformed easily.

3. The gasket according to claim 2, wherein the resin or rubber comprises main structural units derived from ethylene tetrafluoride and containing a perfluoroalkyl group wherein the alkyl group has 2 to 16 carbon atoms.

4. The gasket according to claim 2, which is a metal C-ring gasket or a spring-energized metal C-ring gasket.

5. The gasket according to claim 1, wherein the resin or rubber comprises main structural units derived from ethylene tetrafluoride and containing a perfluoroalkyl group wherein the alkyl group has 2 to 16 carbon atoms.

6. The gasket according to claim 5, which is a metal C-ring gasket or a spring-energized metal C-ring gasket.

7. The gasket according to claim 1, which is a metal C-ring gasket or a spring-energized metal C-ring gasket.

* * * * *